(12) United States Patent
Gowida et al.

(10) Patent No.: US 12,509,952 B2
(45) Date of Patent: Dec. 30, 2025

(54) METHOD OF UNDERBALANCED DRILLING USING FOAMING AGENT

(71) Applicant: KING FAHD UNIVERSITY OF PETROLEUM AND MINERALS, Dhahran (SA)

(72) Inventors: Ahmed Hamdy Gowida, Dhahran (SA); Salaheldin Mahmoud Ahmed Elkatatny, Dhahran (SA); Ahmed Mohamed Farid Ibrahim, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/955,083

(22) Filed: Nov. 21, 2024

(65) Prior Publication Data

US 2025/0354444 A1 Nov. 20, 2025

Related U.S. Application Data

(60) Provisional application No. 63/647,857, filed on May 15, 2024.

(51) Int. Cl.
*E21B 21/08* (2006.01)
*C09K 8/38* (2006.01)

(52) U.S. Cl.
CPC .............. *E21B 21/085* (2020.05); *C09K 8/38* (2013.01)

(58) Field of Classification Search
CPC .............................. E21B 21/085; C09K 8/38
See application file for complete search history.

(56) References Cited

U.S. PATENT DOCUMENTS

| 5,614,473 | A | 3/1997 | Dino et al. |
| 2005/0137114 | A1* | 6/2005 | Gatlin .................... C09K 8/703 510/424 |
| 2012/0088697 | A1 | 4/2012 | Gatlin et al. |
| 2015/0291874 | A1 | 10/2015 | Gatlin et al. |
| 2017/0240804 | A1 | 8/2017 | Tellez et al. |
| 2023/0159815 | A1 | 5/2023 | Kakadjian et al. |

OTHER PUBLICATIONS

Hua Li, et al., "2-D pore-scale oil recovery mechanisms of the anionic and nonionic surfactants", Colloids and Surfaces A: Physicochemical and Engineering Aspects, vol. 655, Sep. 28, 2022, 130245, 7 pages.

* cited by examiner

*Primary Examiner* — Crystal J Lee
(74) *Attorney, Agent, or Firm* — Oblon, McClelland, Maier & Neustadt, L.L.P.

(57) ABSTRACT

A method for underbalanced drilling includes drilling into a subterranean geological formation to form a wellbore therein, injecting a foaming agent into the wellbore during drilling at a wellbore pressure that is below a pore pressure of the subterranean geological formation, and transporting drill cuttings formed by the drilling away from the drilling surface in the foam. The foaming agent forms a foam in the wellbore at a drilling surface at a bottom of the wellbore. The foaming agent is an aqueous solution including an ammonium alcohol ether sulfate surfactant.

17 Claims, 11 Drawing Sheets

| DI Water | 60 s | 600 s | 1800 s |
|---|---|---|---|
| CPID-Foam | Bubble count/mm²: 61.921<br>Mean bubble area: 16150 µm²<br>Min. bubble area: 4810 µm²<br>Max. bubble area: 128459 µm² | Bubble count/mm²: 4.134<br>Mean bubble area: 241882 µm²<br>Min. bubble area: 5131 µm²<br>Max. bubble area: 2253253 µm² | Bubble count/mm²: 1.104<br>Mean bubble area: 906049 µm²<br>Min. bubble area: 14879 µm²<br>Max. bubble area: 7605034 µm² |
| Com DrillFoam | Bubble count/mm²: 80.759<br>Mean bubble area: 12382 µm²<br>Min. bubble area: 4863 µm²<br>Max. bubble area: 108053 µm² | Bubble count/mm²: 5.360<br>Mean bubble area: 186575 µm²<br>Min. bubble area: 5810 µm²<br>Max. bubble area: 1564212 µm² | Bubble count/mm²: 1.971<br>Mean bubble area: 507421 µm²<br>Min. bubble area: 5368 µm²<br>Max. bubble area: 2676130 µm² |

| FW | 60 s | 600 s | 1800 s |
|---|---|---|---|
| CPID-Foam |  Bubble count/mm²: 58.905<br>Mean bubble area: 16976 µm²<br>Min. bubble area: 4831 µm²<br>Max. bubble area: 234737 µm² |  Bubble count/mm²: 4.592<br>Mean bubble area: 217748 µm²<br>Min. bubble area: 5069 µm²<br>Max. bubble area: 2075005 µm² |  Bubble count/mm²: 0.943<br>Mean bubble area: 1060107 µm²<br>Min. bubble area: 6978 µm²<br>Max. bubble area: 4775081 µm² |
| Com DrillFoam |  Bubble count/mm²: 54.587<br>Mean bubble area: 18319 µm²<br>Min. bubble area: 4865 µm²<br>Max. bubble area: 228782 µm² |  Bubble count/mm²: 15.676<br>Mean bubble area: 63791 µm²<br>Min. bubble area: 4865 µm²<br>Max. bubble area: 932388 µm² |  Bubble count/mm²: 2.932<br>Mean bubble area: 341067 µm²<br>Min. bubble area: 5598 µm²<br>Max. bubble area: 2129944 µm² |

METHOD OF UNDERBALANCED DRILLING USING FOAMING AGENT

BACKGROUND

Technical Field

The present disclosure is directed to an underbalanced drilling process and, more particularly, relates to a method of underbalanced drilling using a foaming agent.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Underbalanced foam drilling (UBD) is a drilling technique used to drill oil and gas wells where the pressure in the wellbore is kept lower than the static pressure of the formation being drilled. As the well is being drilled, formation fluid flows into the wellbore and up to the surface. Conventional or "overbalanced" drilling is a drilling technique that uses a denser drilling fluid than the formation fluid to maintain a higher pressure in the wellbore than the formation pressure. UBD provides significant advantages over conventional drilling methods. In a conventional well, drilling mud is forced into the formation in a process called invasion, which frequently causes formation damage, however, in UBD, if the under-balanced state is maintained until the well becomes productive, invasion does not occur and formation damage can be completely avoided. Further, in UBD, the decreased pressure at the bottom of the well-bore makes it easier for the drill bit to cut and remove rock, increasing the rate of penetration (ROP). In conventional drilling methods, when drilling mud flows into the formation uncontrollably, lost circulation occurs. Large amounts of mud can be lost before a proper mud cake forms, or the loss can continue indefinitely. If the well is drilled underbalanced, mud will not enter the formation and lost circulation can be avoided.

There are several UBD techniques including, but not limited to, dry air, mist, foam, airlift, and aerated mud drilling. In foam drilling, a foaming agent is added to the flow to create a foam in the wellbore. A desired foam has a low density and high viscosity to help transport cuttings to the surface, improving hole cleaning. In addition to increased efficiency, the foam can help reduce the risk of pore blocking, phase trapping, and clay reaction thus leading to reduced formation damage. Further, the foam can reduce the risk of wellbore collapse by reducing the influx of formation fluids, thus improving borehole stability. Maintaining foam stability in demanding conditions, such as high water salinity or alkaline environments, can be a challenge to foam drilling.

A drilling foam may be a composition of a gas, a liquid, and a foaming agent, the foaming agent typically being a surfactant. A drilling foam may be a dispersion of gas in a continuous liquid phase, held together by the surfactant. The gas phase in a drilling foam may comprise nitrogen, air, carbon dioxide, or natural gas, while the liquid phase can be either water for aqueous-based foams or diesel/hydrocarbon oil for non-aqueous drilling foam systems. Drilling foams may be classified as either a wet or a dry drilling foam. Wet drilling foams have high liquid content and weak structure. Dry drilling foams have increased stability due to their rigid liquid film structure and lower drainage volume, leading to a transition from a spherical foam shape to a polyhedral shape. Foam generation may occur by three mechanisms, including particle absorption, stratification of nonadsorbing particles, and variations in capillary pressure due to adsorbed particles. Drilling foam systems further have good inherent viscosity and fluid-loss control properties, thus allowing them to aid in preventing fluid loss, minimizing formation damage, and ensuring reliable hole cleaning.

The stability of drilling foams may be limited in three ways, causing foam decay over time, i.e., liquid drainage, coarsening, and bubble coalescence. Liquid drainage is the flow of liquid relative to the gas bubbles. Liquid drainage of a drilling foam is accelerated by gravity and/or capillary forces and is resisted by viscous forces. As the foam drains, the amount of liquid inside the film between bubbles changes. Liquid drainage is a significant contributor to foam decay, as it reduces the liquid content of the foam, which governs the thickness of the lamella film (a thin liquid layer that separates gas bubbles in the foam). The presence of a thicker lamella film between the foam bubbles allows for greater liquid retention. Additionally, the thicker lamella allows for greater liquid retention, contributing to the rounded appearance of the bubbles and the prolonged maintenance of this shape which leads to a more stable foam. Coalescence is a process in drilling foams where small drops of liquid merge together to form larger drops. This can happen when the emulsion film around the droplets weakens, which can lead to the breakdown of the emulsion and subsequent destabilization of the foam. Bubble coarsening, or Ostwald ripening, is a process that occurs in foams when larger bubbles grow at the expense of smaller bubbles. In drilling foams, bubble coarsening can affect the foam's structure and decrease its ability to reduce gas diffusion between the bubbles, leading to destabilization of the foam.

Additional factors that may also influence the stability of a drilling foam include foam quality, surfactant concentration, pH, temperature, liquid salinity, the presence of polymers, foam generation method, surface tension, and gas type. Surfactants added to the base liquid of a drilling foam are important in producing more stable drilling foams, as they decrease interfacial tension and form stable liquid film structures, leading to a more consistent foam structure that improves the stability of the drilling foam. Surfactants may adhere to the gas-liquid interface to increase the stability of drilling foams. The surfactant particles are adsorbed to the surface of the bubbles, the plateau border (point of connection among three approaching bubble), and the lamella between bubbles. The adsorbed particles at the plateau border form a dense film surrounding the bubbles to improve stability by reducing coalescence during drainage.

Foam stability may be measured by the foam's volume or height changes over time after foam generation begins. Specifically, drilling foam stability can be described in terms of the foam half-life ($H_0$), and the drainage half-life time ($t_{FLS\ 50\%}$). The foam half-life ($H_0$) indicates the duration where the foam volume is reduced to 50% of its initial value due to foam decay. The foam half-life can be determined by calculating the foam volume stability (FVS), which is the percentage of foam volume that remains compared to the maximum foam volume after foaming has ceased. Foam liquid stability (FLS) assesses the stability of the drilling foam and its drainage properties. FLS indicates the drilling foam's capability to retain liquid and determines the level of dryness of the drilling foam. The 50% drainage half-life time ($t_{FLS\ 50\%}$) denotes the point at which FLS reduces to half of its original value.

For UBD applications, research on several drilling-foam systems have been conducted with various types of additives, such as stabilizers, polymers, and surfactants. Frequently tested surfactants include commercial products, anionic surfactants (e.g., sodium dodecyl sulfate), cationic surfactants (e.g., cetyltrimethylammonium bromide) and amphoteric surfactants (e.g., n-alkyl betaines). Similarly, stabilizers have been researched, including xanthan gum, hydroxyl-ethylcellulose (HEC), carboxymethyl cellulose (CMC), guar gum, dris pac, and partially hydrolyzed polyacrylamide (PHPA). Multiple research studies have investigated different drilling-foam systems for UBD applications, however, performance of the investigated drilling foams at high pH conditions, which is highly recommended in drilling practice to avoid corrosion, is not reported. Moreover, the stability of the drilling-foam systems should be tested against formation influxes, e.g., brine. Hence, there remains a need to investigate the drilling foam performance at a high pH environment and its compatibility with saline water.

Accordingly, one object of the present disclosure is to provide a surfactant that is capable of forming a foam within a high pH range (mildly alkaline pH range of 9.5 to 10.5) and in an environment with increased salinity within a wellbore, maintaining stability in harsh drilling environments while being compatible with water-sensitive formations.

SUMMARY

In an exemplary embodiment, a method of underbalanced drilling is described. The method comprises drilling into a subterranean geological formation to form a wellbore therein. The method further comprises injecting a foaming agent into the wellbore during drilling at a wellbore pressure that is below a pore pressure of the subterranean geological formation. The foaming agent forms a foam in the wellbore at a drilling surface at a bottom of the wellbore. The foaming agent is an aqueous solution that comprises an ammonium alcohol ether sulfate surfactant. The method further comprises transporting drill cuttings formed by the drilling away from the drilling surface in the foam.

In some embodiments, the foaming agent has a pH of 8 to 11.

In some embodiments, the foaming agent has an initial bubble count of at least 60 per square millimeter ($mm^2$).

In some embodiments, the foaming agent has an average bubble area of at least 160,000 square micrometer ($\mu m^2$) after 60 sec.

In some embodiments, the surfactant is present in the foaming agent in an amount of 0.25 to 0.75 wt. %.

In some embodiments, the foaming agent has a pH of 9 to 10.

In some embodiments, the foaming agent is an aqueous solution that further comprises at least one selected from the group consisting of deionized water, synthetic seawater, and formation water.

In some embodiments, the foaming agent is an aqueous solution that further comprises formation water.

In some embodiments, the surfactant is present in the foaming agent in an amount of 0.5 wt. %.

In some embodiments, the foaming agent has a foam height ($H_0$) of at least 193 mm.

In some embodiments, the foaming agent has an initial bubble count of at least 80 per $mm^2$.

In some embodiments, the foaming agent has an initial foam height ($H_0$) of at least 60 mm.

In some embodiments, the foaming agent has an initial bubble count of at least 75 $mm^2$.

In some embodiments, the foaming agent has a spherical foam structure.

In some embodiments, a bubble count of the foaming agent decreases by less than 25% over 2 hours.

In some embodiments, the foaming agent has a pH of 9.5.

In some embodiments, the foaming agent has a foam half-life ($H_0$) of at least 35 min.

In some embodiments, the foaming agent has a foam half-life ($H_0$) of at least 56 min.

In some embodiments, the foaming agent has a drainage half-life ($t_{FLS50\%}$) of at least 89 min.

In some embodiments, the foaming agent has an average bubble area of at least 700,000 $\mu m^2$ after 30 min.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, reference numerals designate identical or corresponding parts throughout the several views. Embodiments of the present disclosure will now be described more fully hereinafter with reference to the accompanying drawings, in which some, but not all embodiments of the disclosure are shown.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "compound" and "surfactant" are used interchangeably, and are intended to refer to a chemical entity, whether in the solid, liquid or gaseous phase, and whether in a crude mixture or purified and isolated.

As used here, the term "underbalanced drilling" refers to a non-conventional method of drilling in which the hydrostatic pressure of the drilling fluid is intentionally kept lower than the formation pore pressure. It is often implemented as an alternative technique for minimizing drilling-induced formation damage, increasing well productivity, preventing loss of circulation, and improving drilling performance. The potential for UBD technology extends to many different downhole scenarios, including naturally fractured formations, depleted reservoirs, hard formations, high permeability vuggy carbonates, and high permeability unconsolidated or consolidated sands.

As used here, term "foamability of a surfactant" refers to its ability to generate foam regardless of its properties. It can be described by the initial foam volume ($V_{Initial}$) generated once the gas injection through the porous plate has stopped.

As used here, term "foam half-life ($H_0$)" indicates the duration where the foam volume is reduced to 50% of its initial value due to foam decay. The foam half-life can be determined by calculating the foam volume stability (FVS), which is the percentage of foam volume that remains compared to the maximum foam volume after foaming has ceased. FVS can be calculated using the following equation:

$$FVS(t) = \frac{V_t(\text{foam})}{V_{Initial}(\text{foam})} \times 100$$

where V is the foam volume observed in the cylindrical glass column, the subscript t refers to the measured foam volume at a certain time, and $V_{Initial}$ stands for the initial foam volume immediately after the bubbling has stopped. Afterward, $H_0$ can be estimated by monitoring the FVS values over time and how long it would take the foam volume to be reduced by 50% of its initial value.

As used here, the term "foam liquid stability (FLS)" is another crucial aspect that must be considered to assess the stability of foam and its drainage properties. FLS indicates the foam's capability to retain liquid and determines the level of dryness of the foam. The 50% drainage half-life time ($t_{FLS\ 50\%}$) denotes the point at which FLS reduces to half its original value. The calculation for FLS can be determined using the following equation.

$$FLS(t) = \frac{v_{i(liquid)} - v_{t(liquid)}}{v_{i(liquid)} - v_{f(liquid)}} \times 100\%$$

where, $V_{i\ (liquid)}$ denotes the initial volume of the liquid before gas bubbling takes place. After bubbling, the volume of the liquid, $Vt_{(liquid)}$, changes for a specified duration, t. The subscript f refers to the final condition (after foaming stopped or at the end of the bubbling process). The disparity between these values signifies the amount of liquid that gets trapped inside the foam structure. The drainage half-life time ($t_{FLS\ 50\%}$) marks the time it takes 50% of the liquid to drain out of the foam structure. Thus, the foam system has better stability when the $t_{FLS50\%}$ value is higher, indicating that the foam can hold more liquid within the lamella film and minimize liquid drainage out of the foam.

As used here, term "drainage half-life time ($t_{FLS\ 50\%}$)" marks the time it takes 50% of the liquid to drain out of the foam structure. Thus, the foam system has better stability when the $t_{FLS50\%}$ value is higher, indicating that the foam can hold more liquid within the lamella film and minimize liquid drainage out of the foam.

Aspects of the present disclosure relate to an anionic foaming agent that is stable at high pH and compatible with the properties of the drilled formations, i.e., water-sensitive clay. The foaming compositions of the present disclosure are ideally suited for drilling operations, especially underbalanced drilling operations, recyclable drilling operations, coiled tubing drilling and clean-out operations, capillary coiled tubing (CCT) applications (foaming CCT production), foam applications, recyclable foam drilling applications, well intervention service applications, well cleanout applications, formation clean outs (fracturing or pumping foam into the formation to open formation for oil and/or gas production), or similar applications.

Figure 1:
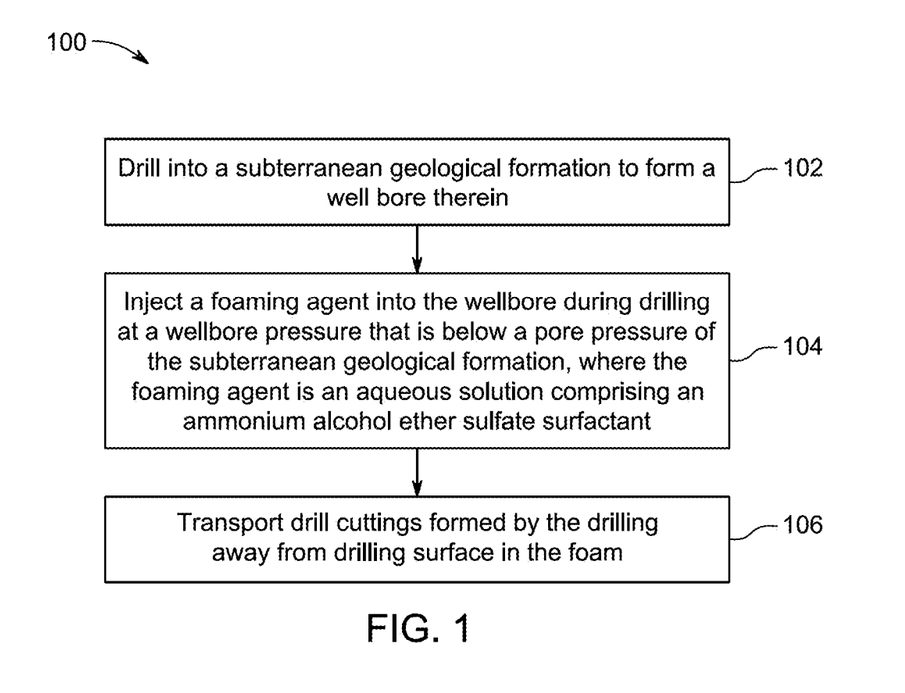
FIG. 1 is a schematic flow chart of a method of underbalanced drilling, according to certain embodiments.

Referring to FIG. 1, a method 100 of underbalanced drilling by a foaming agent is described. The order in which the steps 100 are described is not intended to be construed as a limitation, and any number of the described method steps may be combined in any order to implement the method 100. Additionally, individual steps may be removed or skipped from method 100 without departing from the spirit and scope of the present disclosure.

At step 102, the method 100 comprises drilling into a subterranean geological formation to form a wellbore therein. The subterranean geological formation comprises a shale formation, a clay formation, a carbonate formation, a sandstone formation, or a like formation. In preferred embodiments, the subterranean geological formation is a shale formation, which contains clay minerals and quartz. In another preferred embodiment, the subterranean geological formation is a clay formation containing chlorite, illite, kaolinite, montmorillonite and smectite. In some embodiments, the subterranean geological formation is a carbonate formation, e.g. limestone or dolostone, which contains carbonate minerals, such as calcite, aragonite, dolomite, etc, or a sandstone formation, for example, a formation that contains quartz, feldspar, rock fragments, mica and numerous additional mineral grains held together with silica and/or cement.

A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc. In one embodiment, the wellbore is a vertical wellbore, a horizontal wellbore, a multilateral wellbore, or an extended reach wellbore.

At step 104, method 100 comprises injecting a foaming agent into the wellbore during drilling at a wellbore pressure below the pore pressure of the subterranean geological formation. The foaming agent comprises an aqueous solution, including an ammonium alcohol ether sulfate surfactant. In one of the preferred embodiments, ammonium alcohol ether sulfate surfactant (CPID) is used as an anionic surfactant in well-drilling applications.

The ammonium alcohol ether sulfate consists of a hydrocarbon chain (derived from an alcohol) attached to an ethoxylated group (a chain of ethylene oxide units), which is then bonded to a sulfate group and neutralized with an ammonium ion ($NH_4^+$). The ammonium alcohol ether sulfate has a chemical formula of Formula (I).

$$C_nH_{2n+1}(OCH_2CH_2)_yOSO_3^-NH_4^+$$  Formula (I)

In Formula I, "n" represents the length of the hydrocarbon chain and "y" represents the number of ethoxylated units. In some embodiments, x is a non-zero integer of 1 to 15, such as 1, 2, 3, 4, 5, 6, 7, 8, 9, 10, 11, 12, 13, 14, or 15. In a preferred embodiment, n is 10 to 12 such as 10, 11, or 12. In some embodiments, y is a non-zero integer of 1 to 10, such as 1, 2, 3, 4, 5, 6, 7, 8, 9, or 10. In a preferred embodiment, y is 3 to 5, such as 3, 4, or 5.

The amount of surfactant present in the foaming agent may vary depending on the drilling operation, wellbore conditions, etc. However, typically, the surfactant disclosed herein in any of its embodiments is present at 0.25 to 0.75 wt. % relative to the total weight of the drilling fluid, preferably 0.3 to 0.7 wt. %, preferably 0.35 to 0.65 wt. %, preferably 0.40 to 0.60 wt. %, preferably 0.45 to 0.55 wt. %, most preferably 0.50 wt. % relative to the total weight of the drilling fluid.

The aqueous solution is at least one of deionized water, synthetic seawater, and formation water. In some embodiments, the foaming agent is an aqueous solution of water.

In some embodiments, the synthetic seawater comprises 5.5 to 6.5 g/L $Na_2SO_4$, 0.1 to 0.2 g/L $NaHCO_3$, 2 to 3 g/L $CaCl_2 \cdot 2H_2O$, 17 to 18 g/L $MgCl_2 \cdot 6H_2O$, and 41 to 42 g/L NaCl. In another embodiment, the synthetic seawater comprises 5.6 to 6.4 g/L $Na_2SO_4$, preferably 5.7 to 6.4 g/L, preferably 5.8 to 6.4 g/L, preferably 5.9 to 6.4 g/L, preferably 6.0 to 6.4 g/L, preferably 6.1 to 6.4 g/L, preferably 6.2 to 6.4 g/L, preferably 6.3 to 6.4 g/L, most preferably 6.34 g/L $Na_2SO_4$. In another embodiment, the synthetic seawater comprises 0.1 to 0.2 g/L $NaHCO_3$, preferably 0.11 to 0.19 g/L, preferably 0.12 to 0.18 g/L, preferably 0.13 to 0.17 g/L, preferably 0.14 to 0.17 g/L, preferably 0.15 to 0.17 g/L, preferably 0.16 to 0.17 g/L, most preferably 0.16 g/L $NaHCO_3$. In another embodiment, the synthetic seawater comprises 2.1 to 2.9 g/L $CaCl_2 \cdot 2H_2O$, preferably 2.2 to 2.8 g/L, preferably 2.3 to 2.7 g/L, preferably 2.3 to 2.6 g/L, preferably 2.3 to 2.5 g/L, preferably 2.3 to 2.4 g/L, most preferably 2.39 g/L $CaCl_2 \cdot 2H_2O$. In another embodiment, the synthetic seawater comprises 17.1 to 17.9 g/L $MgCl_2 \cdot 6H_2O$, preferably 17.2 to 17.8 g/L, preferably 17.3 to 17.7 g/L, preferably 17.4 to 17.7 g/L, preferably 17.5 to 17.7 g/L, preferably 17.6 to 17.7 g/L, most preferably 17.64 g/L $MgCl_2 \cdot 6H_2O$. In another embodiment, the synthetic seawater comprises 41.1 to 41.9 g/L NaCl, preferably 41.1 to 41.8 g/L, preferably 41.1 to 41.7 g/L, preferably 41.1 to 41.6 g/L, preferably 41.1 to 41.5 g/L, preferably 41.1 to 41.4 g/L, preferably 41.1 to 41.3 g/L, preferably 41.1 to 41.2 g/L, most preferably 41.17 g/L NaCl. In a preferred embodiment, the synthetic water comprises 6.34 g/L $Na_2SO_4$, 0.16 g/L $NaHCO_3$, 2.39 g/L $CaCl_2 \cdot 2H_2O$, 17.64 g/L $MgCl_2 \cdot 6H_2O$, and 41.17 g/L NaCl. In one embodiment, the synthetic seawater comprises 60 to 70 g/L of total dissolved solids (TDS), preferably 61 to 69 g/L, preferably 62 to 68 g/L, preferably 63 to 68 g/L, preferably 64 to 68 g/L, preferably 65 to 68 g/L, preferably 66 to 68 g/L, preferably 67 to 68 g/L, most preferably 67.70 g/L TDS.

In some embodiments, the formation water comprises 0.5 to 0.6 g/L $Na_2SO_4$, 0.4 to 0.5 g/L $NaHCO_3$, 60 to 70 g/L $CaCl_2 \cdot 2H_2O$, 20 to 21 g/L $MgCl_2 \cdot 6H_2O$, and 150 to 151 g/L NaCl. In another embodiment, the formation water comprises 0.51 to 0.59 g/L $Na_2SO_4$, preferably 0.52 to 0.58 g/L, preferably 0.52 to 0.57 g/L, preferably 0.52 to 0.56 g/L, preferably 0.52 to 0.55 g/L, preferably 0.52 to 0.54 g/L, preferably 0.52 to 0.53 g/L, most preferably 0.52 g/L $Na_2SO_4$. In another embodiment, the formation water comprises 0.41 to 0.49 g/L $NaHCO_3$, preferably 0.42 to 0.49 g/L, preferably 0.43 to 0.49 g/L, preferably 0.44 to 0.49 g/L, preferably 0.45 to 0.49 g/L, preferably 0.46 to 0.49 g/L, preferably 0.47 to 0.49 g/L, preferably 0.48 to 0.49 g/L, most preferably 0.49 g/L $NaHCO_3$. In another embodiment, the formation water comprises 61 to 70 g/L $CaCl_2 \cdot 2H_2O$, preferably 62 to 70 g/L, preferably 63 to 70 g/L, preferably 64 to 70 g/L, preferably 65 to 70 g/L, preferably 66 to 70 g/L, preferably 67 to 70 g/L, preferably 68 to 70 g/L, preferably 69 to 70 g/L, most preferably 69.84 g/L $CaCl_2 \cdot 2H_2O$. In another embodiment, the formation water comprises 20 to 21 g/L $MgCl_2 \cdot 6H_2O$, preferably 20.1 to 20.9 g/L, preferably 20.2 to 20.8 g/L, preferably 20.3 to 20.7 g/L, preferably 20.4 to 20.6 g/L, preferably 20.4 to 20.5 g/L, most preferably 20.4 g/L $MgCl_2 \cdot 6H_2O$. In another embodiment, the formation water comprises 150.1 to 150.9 g/L NaCl, preferably 150.2 to 150.8 g/L, preferably 150.3 to 150.7 g/L, preferably 150.4 to 150.6 g/L, preferably 150.4 to 150.5 g/L, most preferably 150.45 g/L NaCl. In a preferred embodiment, the formation water comprises 0.52 g/L $Na_2SO_4$, 0.49 g/L $NaHCO_3$, 69.84 g/L $CaCl_2 \cdot 2H_2O$, 20.40 g/L $MgCl_2 \cdot 6H_2O$, and 150.45 g/L NaCl. In one embodiment, the formation water comprises 240 to 242 g/L of total dissolved solids (TDS), preferably 240.5 to 242 g/L, preferably 241 to 242 g/L, preferably 241.5 to 242 g/L, most preferably 241.70 g/L TDS.

The aqueous solution may optionally comprise any number of suitable additives. Exemplary additives include, but are not limited to, weighting agents, emulsifiers, viscosities, fluid-loss control agents, bridging agents, pH controlling agents, defoamers, clay stabilizers, anti-scalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, and the like. A person of ordinary skill in the art, with the benefit of this disclosure, will recognize the types and suitable amounts of additives that may be included in the aqueous solution for a particular application, without undue experimentation.

Upon injection, the foaming agent forms foam in the wellbore at a drilling surface at the bottom of the wellbore. Foam is a composition of gas, liquid, and foaming agent, which is typically a surfactant. It is defined as the dispersion of gas in a continuous liquid phase, held together by the surfactant. The gas phase in the foam can consist of nitrogen, air, carbon dioxide, or natural gas, while the liquid phase can be either water for aqueous-based foams or diesel/hydrocarbon oil for non-aqueous drilling foam systems. In some embodiments, the foaming agent is an aqueous solution that comprises at least one selected from the group consisting of deionized water, synthetic seawater, and formation water. In some embodiments, the foaming agent is an aqueous solution of water. In some embodiments, the foaming agent is an aqueous solution comprising the formation water.

Foam is characterized by its high viscosity, compared to other UBD fluids, which allows for effective cuttings transport, and its low density, which allows for underbalanced conditions. Foam drilling avoids potential formation damage that can occur with conventional overbalanced drilling methods. Because foam systems have good inherent viscosity and fluid-loss control properties, they are an attractive drilling medium that can prevent fluid loss, minimize formation damage, and ensure reliable hole cleaning.

When designing a drilling foam system, the primary concern is maintaining stability in harsh drilling environments while being compatible with water-sensitive formations. To be a suitable foam system for underbalanced drilling, some criteria must be met, such as maintaining enough stability to transport cuttings to the surface, maintaining a mildly alkaline pH range of 9.5 to 10.5 by treating the water, and tolerating the salts that may come into the wellbore from the formation due to underbalanced conditions, such as saline water. In some embodiments, the foaming agent has a pH of 8 to 11, preferably a pH of 8.5 to 10.5, preferably a pH of 9 to 10, most preferably a pH of 9.5.

In one or more embodiments, the foaming agent has an initial bubble count of at least 65 per $mm^2$, preferably at least 66 per $mm^2$, preferably at least 67 per $mm^2$, preferably at least 68 per $mm^2$, preferably at least 69 per $mm^2$, preferably at least 70 per $mm^2$, preferably at least 75 per $mm^2$, preferably at least 76 per $mm^2$, preferably at least 77 per $mm^2$, preferably at least 78 per $mm^2$, preferably at least 79 per $mm^2$, preferably at least 80 per $mm^2$, preferably at least 81 per $mm^2$, preferably at least 82 per $mm^2$, preferably at least 83 per $mm^2$, preferably at least 84 per $mm^2$, most preferably at least 85 per $mm^2$. In one or more embodiments, the foaming agent has an average bubble area of at least 12,000 $\mu m^2$ after 60 sec, preferably at least 12,200 $\mu m^2$, preferably at least 12,400 $\mu m^2$, preferably at least 12,600 $\mu m^2$, preferably at least 12,800 $\mu m^2$, preferably at least 13,000 $\mu m^2$, preferably at least 13,200 $\mu m^2$, preferably at least 13,400 $\mu m^2$, preferably at least 13,600 $\mu m^2$, preferably at least 13,800 $\mu m^2$, preferably at least 14,000 $\mu m^2$, preferably at least 14,200 $\mu m^2$, preferably at least 14,400 $\mu m^2$, preferably at least 14,600 $\mu m^2$, preferably at least 14,800 $\mu m^2$, preferably at least 15,000 $\mu m^2$, preferably at least 15,200 $\mu m^2$, preferably at least 15,400 $\mu m^2$, preferably at least 15,600 $\mu m^2$, preferably at least 15,800 $\mu m^2$, preferably at least 16,000 $\mu m^2$. In one or more embodiments, the foaming agent has an average bubble area of at least 15,000 $\mu m^2$, preferably at least 15,100 $\mu m^2$, preferably at least 15,200 $\mu m^2$, preferably at least 15,300 $\mu m^2$, preferably at least 15,400 $\mu m^2$, preferably at least 15,500 $\mu m^2$, preferably at least 15,600 $\mu m^2$, preferably at least 15,700 $\mu m^2$, preferably at least 15,800 $\mu m^2$, preferably at least 15,900 $\mu m^2$, preferably at least 16,000 $\mu m^2$, preferably at least 16,100 $\mu m^2$, preferably at least 16,200 $\mu m^2$, preferably at least 16,300 $\mu m^2$, preferably at least 16,400 $\mu m^2$, preferably at least 16,500 $\mu m^2$, preferably at least 16,600 $\mu m^2$, preferably at least 16,700 $\mu m^2$, preferably at least 16,800 $\mu m^2$, preferably at least 16,900 $\mu m^2$, most preferably at least 16,976 $\mu m^2$ after 60 sec. In some embodiments, the foaming agent has an average bubble area of at least 700,000 $\mu m^2$ after 30 min, preferably at least 710,00 $\mu m^2$, preferably at least 720,000 $\mu m^2$, preferably at least 730,000 $\mu m^2$, preferably at least 740,000 $\mu m^2$, preferably at least 750,000 $\mu m^2$, preferably at least 760,000 $\mu m^2$, preferably at least 770,000 $\mu m^2$, preferably at least 780,000 $\mu m^2$, preferably at least 790,000 $\mu m^2$, preferably at least 800,000 $\mu m^2$, preferably at least 810,000 $\mu m^2$, preferably at least 820,00 $\mu m^2$, preferably at least 830,000 $\mu m^2$, preferably at least 840,000 $\mu m^2$, preferably at least 850,000 $\mu m^2$, preferably at least 860,000 $\mu m^2$, preferably at least 870,000 $\mu m^2$, preferably at least 880,000 $\mu m^2$, preferably at least 890,000 $\mu m^2$, preferably at least 900,000 $\mu m^2$, preferably at least 910,000 $\mu m^2$, preferably at least 920,000 $\mu m^2$, preferably at least 930,000 $\mu m^2$, preferably at least 940,000 $\mu m^2$, preferably at least 950,000 $\mu m^2$, preferably at least 960,000 $\mu m^2$, preferably at least 970,000 $\mu m^2$, preferably at least 980,000 $\mu m^2$, preferably at least 990,000 $\mu m^2$, preferably at least 1,000,000 $\mu m^2$, most preferably at least 1,060,107 $\mu m^2$. In one or more embodiments, the foaming agent produces bubbles having a spherical or polyhedron shape, preferably a spherical shape.

The stability of foaming agent of the present disclosure was found to improve with increasing water salinity and exhibited an upward trend. This indicates good compatibility of the foaming agent with different water salinities that may be encountered during the drilling operation. In some embodiments, the foaming exhibited a foam half-life of more than 180 minutes, similar to the Com-DrillFoam system upon testing at elevated pressure and temperature (pressure=100 psi and temperature=60° C.) using the highest salinity water (FW). In some other embodiments, the foaming agent has a foam half-life ($H_0$) of at least 35 min, preferably at least 40 min, preferably at least 45 min, preferably at least 50 min, preferably at least 50 min, preferably at least 55 min, preferably at least 60 min, preferably at least 65 min, preferably at least 70 min, preferably at least 75 min, preferably at least 80 min, preferably at least 85 min, preferably at least 90 min, preferably at least 95 min, preferably at least 100 min, most preferably at least 102 min. In one or more embodiments, the foaming agent has a drainage half-life ($t_{FLS50\%}$) of at least 89 min, preferably at least 90 min, preferably at least 91 min, preferably at least 92 min, preferably at least 93 min, preferably at least 94 min, preferably at least 95 min, preferably at least 96 min, preferably at least 97 min, preferably at least 98 min, preferably at least 99 min, preferably at least 100 min, preferably at least 101 min, preferably at least 102 min, preferably at least 103 min, preferably at least 104 min, preferably at least 105 min, preferably at least 106 min, preferably at least 107 min, preferably at least 108 min, preferably at least 109 min, preferably at least 110 min, preferably at least 111 min, preferably at least 112 min, preferably at least 113 min, preferably at least 114 min, preferably at least 115 min, preferably at least 116 min, most preferably at least 117 min. In one or more embodiments, the foaming agent has an initial foam height ($H_0$) of at least 60 mm, preferably at least 65 mm, preferably at least 70 mm, preferably at least 75 mm, preferably at least 80 mm, preferably at least 85 mm, preferably at least 90 mm, preferably at least 95 mm, preferably at least 100 mm, preferably at least 105 mm, preferably at least 110 mm, preferably at least 115 mm, preferably at least 120 mm, preferably at least 125 mm, preferably at least 130 mm, preferably at least 135 mm, preferably at least 140 mm, preferably at least 145 mm, preferably at least 150 mm, preferably at least 155 mm, preferably at least 160 mm, preferably at least 165 mm, preferably at least 170 mm, preferably at least 175 mm, preferably at least 180 mm, preferably at least 185 mm, preferably at least 190 mm, most preferably at least 195 mm.

At step 106, the method 100 comprises transporting drill cuttings formed by the drilling away from the drilling surface in the foam.

The examples below are intended to illustrate further protocols for underbalanced drilling with the foaming agent of the present disclosure and are not intended to limit the scope of the claims.

EXAMPLES

The following examples demonstrate the method 100 of underbalanced drilling (UBD) as described herein. The examples are provided solely for illustration and are not to be construed as limitations of the present disclosure, as many variations thereof are possible without departing from the spirit and scope of the present disclosure.

Example 1: Materials

Surfactants: The surfactant used in the present disclosure is ammonium alcohol ether sulfate (CPID). It is a foaming agent used in the UBD operations for foaming drilling fluids. For comparison purposes, a commercial blend drilling-foam system of VersaFoam® Plus from CETCO is used as a reference.

Gas phase: Nitrogen ($N_2$) gas with 99.99% purity stored in a pressurized cylinder was used for foaming.

Liquid phase: Different foaming solutions were prepared by mixing the surfactant with de-ionized (DI) water, synthetic seawater (SW), and formation water (FW). Ultrapure Milli-Q water system, which is 18.2 MΩ cm at room temperature is used as a source for the DI water. ACS-grade chemicals salts were used for preparing the synthetic SW and FW. The mineral composition of the SW and FW used in the present disclosure is listed in Table 1. The pH of the drilling fluid should be in the range between 8.5 to 10.5, known as mildly alkaline, to avoid the corrosion of the drilling equipment. To increase the pH of the prepared foaming solutions to a pH of 9.5, drops of 3M solution of sodium hydroxide (KOH) were added.

TABLE 1

The mineral composition of the synthesized sea water and formation water used in the present disclosure.

| Index | Composition | Sea Water (g/L) | Formation Water (g/L) |
|---|---|---|---|
| 1 | $Na_2SO_4$ | 6.34 | 0.52 |
| 2 | $NaHCO_3$ | 0.16 | 0.49 |
| 3 | $CaCl_2 \cdot 2H_2O$ | 2.39 | 69.84 |
| 4 | $MgCl_2 \cdot 6H_2O$ | 17.64 | 20.40 |
| 5 | NaCl | 41.17 | 150.45 |
| Total dissolved solids (TDS) - g/L | | 67.70 | 241.70 |

Example 2: Synthesis of Foaming Solutions

Figure 2:
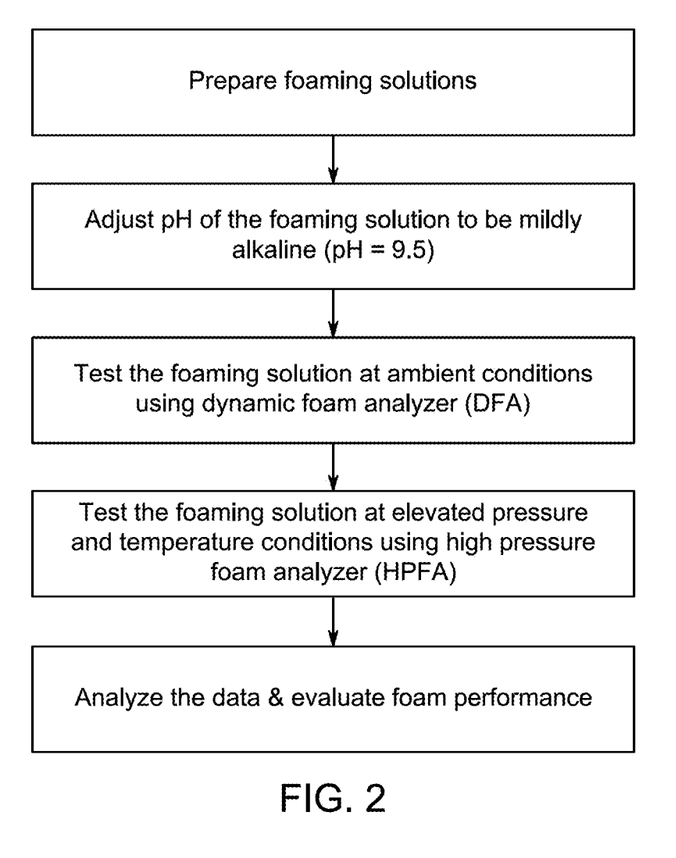
FIG. 2 is a schematic flowchart of a method of evaluating performance of foam, according to certain embodiments.

Three foaming solutions were prepared by mixing 0.5 wt. % of the surfactant with DI, SW, and FW, for which a volumetric flask was used. To ensure the solution homogeneity, a magnetic stirrer was used for mixing the solution components overnight. In the end, few drops of pH buffer of KOH solution were added in the prepared solution to keep the pH at 9.5 as shown in FIG. 2.

Example 3: Foam Testing

Figure 3:
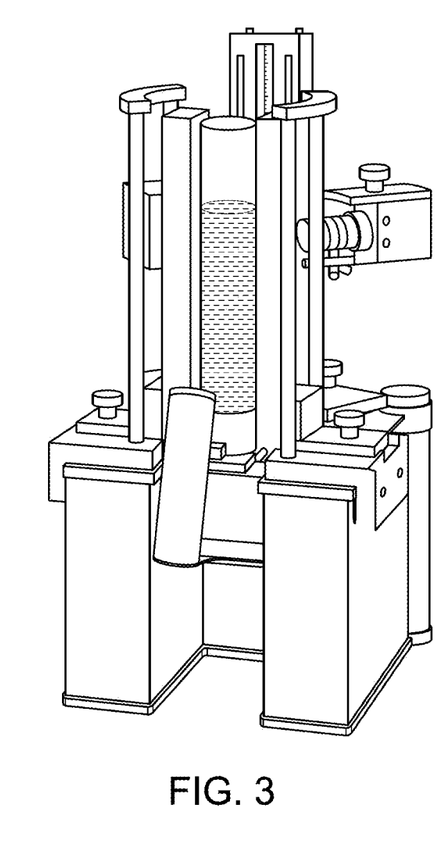
FIG. 3 shows a dynamic foam analyzer (DFA100) used for evaluating performance of the foam, according to certain embodiments.

The foam generated using different foaming solutions was analyzed using a dynamic foam analyzer (DFA 100) system manufactured by Krüss in Germany. A paper holder that was assembled at the base of the measuring column holder is fixed with a porous filter paper with pore size between 16-50 μm. Pour 50 mL of prepared solution in the glass column attached to the base holder and analyze at ambient conditions, as shown in FIG. 3. After getting the device assembled, 150 mL of $N_2$ gas is injected at a rate of 0.2 mL/min until bubbling stops. Subsequently, analysis of generated foam begins, and the ambient condition is used to investigate and evaluate the foaming systems. It is understood that if it does not foam under ambient conditions, it will never foam under harsh conditions of pressure and temperature. Hence, conducting this type of analysis offer insights into the foamability of the tested surfactant and hence its potentiality for further examinations. An optical sensor in the DFA 100 system measures the foam's height, volume, and decay dynamically over time. The system is also equipped with a high-resolution camera to offer details on the foam bubble's size, distribution, count, and structure.

Figure 4:
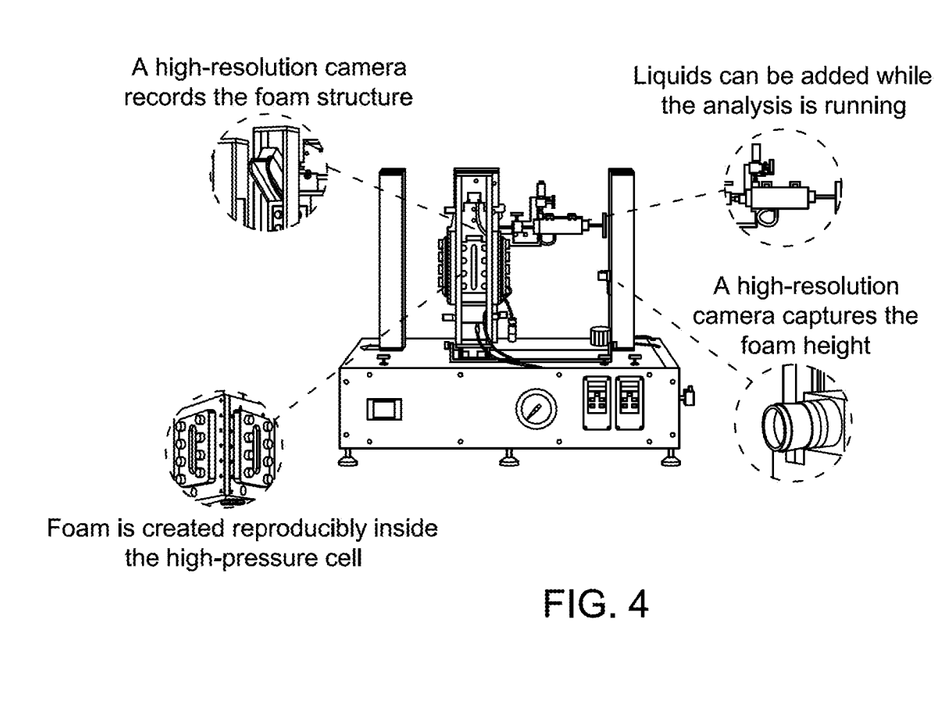
FIG. 4 shows a high-pressure foam analyzer (HPFA) used for measuring stability, structure, and bubble size of the foam, according to certain embodiments.

The HPHT foam analyser was used to measure the foam stability, structure, and bubble size of the foam systems of the present disclosure. The maximum temperature is 120° C., and the maximum operating pressure is 5,000 psi. An electric heating jacket, temperature controller, prisms, cameras, transmitted lights, and a high-pressure view cell are all parts of the foam analyser. As a function of time, an HPHT analyser may concurrently determine the foam structure and foam stability. Using a camera and transmitted light approach, it was possible to measure the foam height vs. time optically. High-resolution bubble form evaluation is made possible by evaluating the size and shape of the bubble using a unique prism arrangement. The KRÜSS high pressure foam analyser (HPFA), as shown in FIG. 4, was utilised to examine the stability of the foam systems at high pressure and temperature, specifically at 60° C. and 1000 psi, which mimic the drilling conditions of intermediate sections.

The stability of the foam system can be analyzed in terms of foam half-life and liquid drainage half-life and the system foamability can be described in terms of the initial foam height, bubble size, count, and distribution. Table 2 summarizes the experimental design matrix conducted in the present disclosure.

TABLE 2

Experimental testing matrix using DFA 100 system

| Test Index | Test Type | Foaming System | Water Type | Surfactant Concentration (wt. %) |
|---|---|---|---|---|
| 1 | Dynamic foam analyzer | CPID-Foam | DI | 0.5 |
| 2 | | Com-DrillFoam | | |
| 3 | Dynamic foam analyzer | CPID-Foam | SW | 0.5 |
| 4 | | Com-DrillFoam | | |
| 5 | Dynamic foam analyzer | CPID-Foam | FW | 0.5 |
| 6 | | Com-DrillFoam | | |
| 7 | HPHT foam analyzer | CPID-Foam | FW | 0.5 |
| 8 | | Com-DrillFoam | | |

Example 4: Foamability

Figure 5:
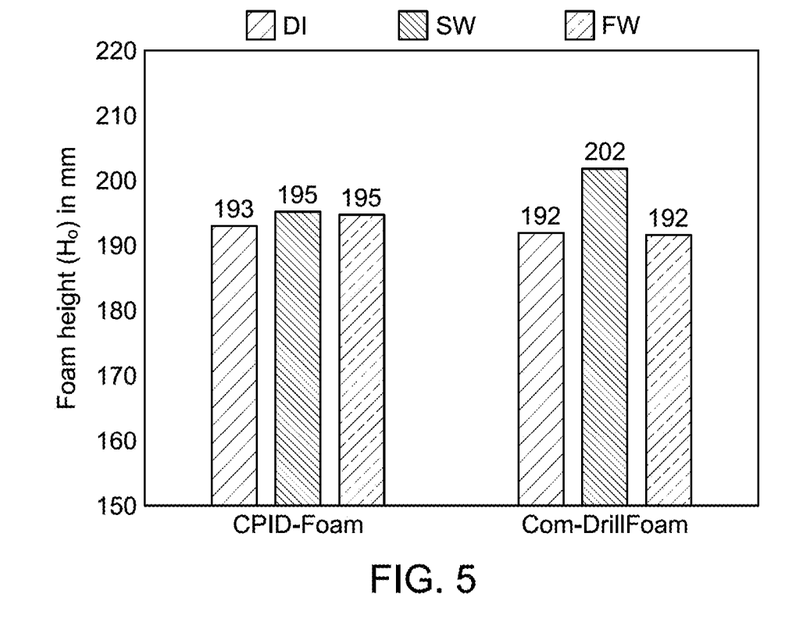
FIG. 5 shows initial foam height of foam systems using de-ionized (DI) water, seawater (SW), and formation water (FW) at ambient conditions, according to certain embodiments.
Figure 6:
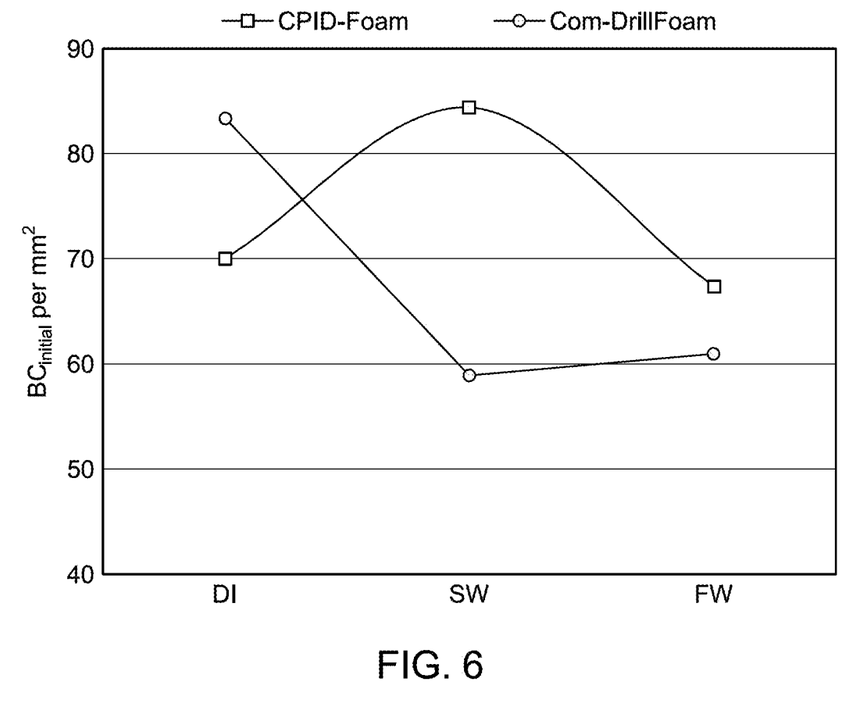
FIG. 6 shows initial bubble count of the foam systems using water with different salinities, according to certain embodiments.

The initial foam height, bubble size, count, and dispersion can all be used to characterize the surfactant's foaming capabilities. Using DFA and HPFA settings, the initial foam height ($H_o$) of the foam systems were analysed. Under ambient conditions, the foam heights of the CPID-Foam showed a strong comparison with those of the Com-DrillFoam blend, with nearly identical foam heights observed for different water salinities, as shown in FIG. 5. Furthermore, the CPID-Foam's initial bubble count per $mm^2$ was higher than the Com-DrillFoam's values for the high-salinity water, excluding DI-water based solution, as shown in FIG. 6.

Figure 7:
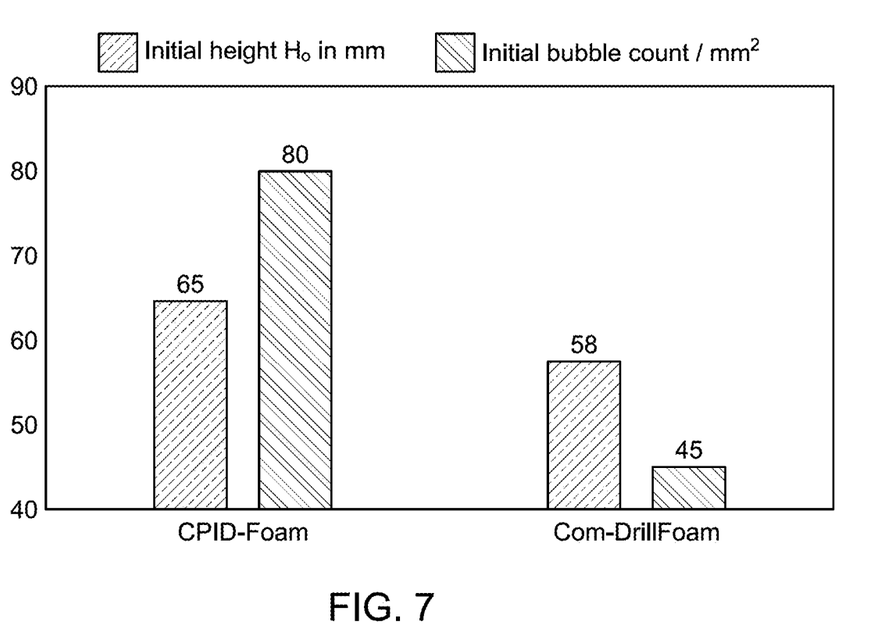
FIG. 7 shows initial foam height and bubble count per $mm^2$ of the foam systems using FW pressure of 1000 psi and temperature of 60° C., according to certain embodiments.

The CPID-Foam produced a significantly higher initial foam height than the Com-DrillFoam under increased pressure and temperature conditions, as shown in FIG. 7, indicating its higher foamability. By analysing the initial bubble count per $mm^2$ at the first stage of bubbling, as shown in FIG. 7, this observation was further validated because the CPID foam's initial bubble count per millimetre was found to be somewhat higher.

Figure 8:
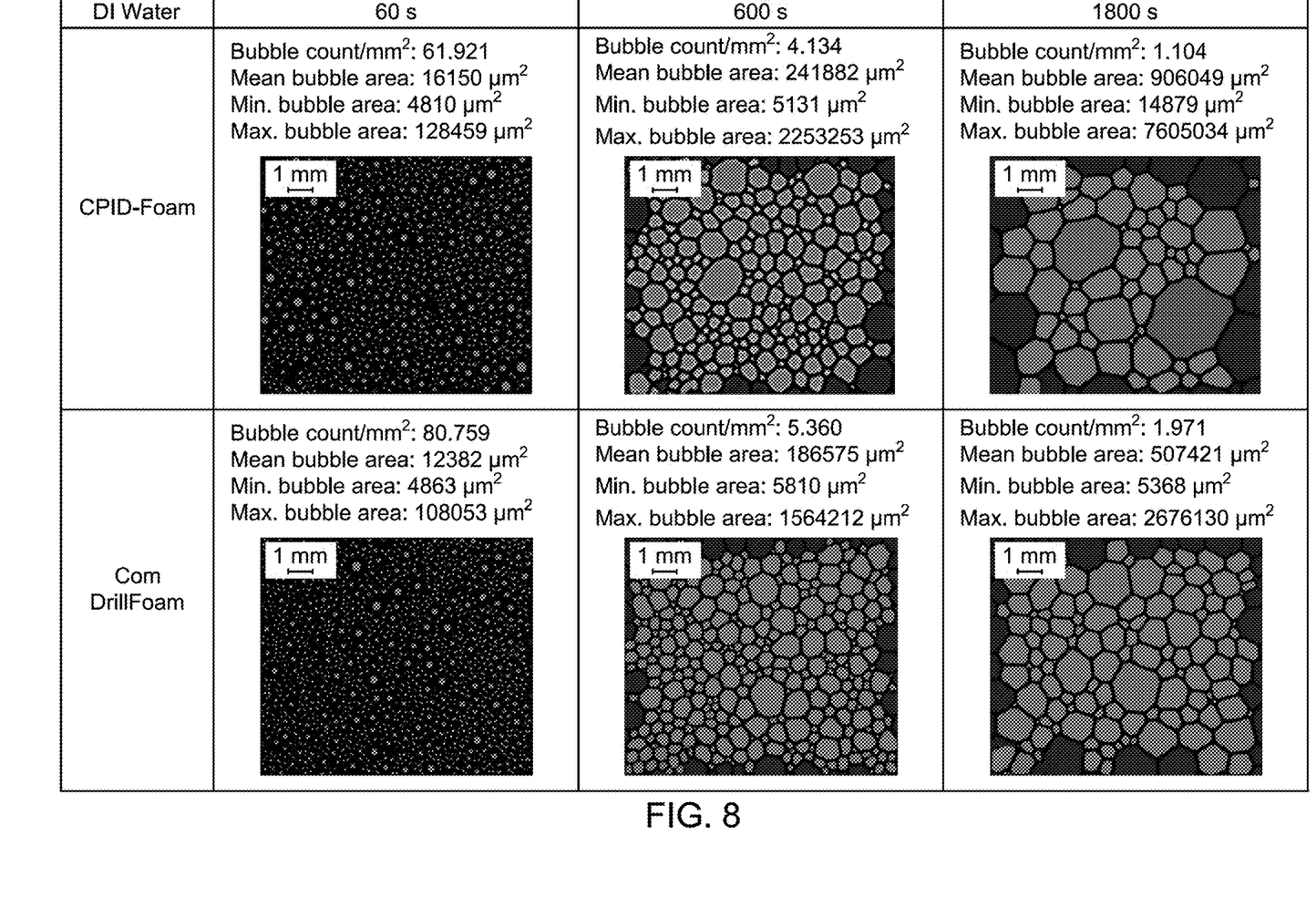
FIG. 8 shows two dimensional (2D) images of foam structure and bubble size of the foam systems using DI water at different time intervals under ambient conditions, according to certain embodiments.
Figure 9:
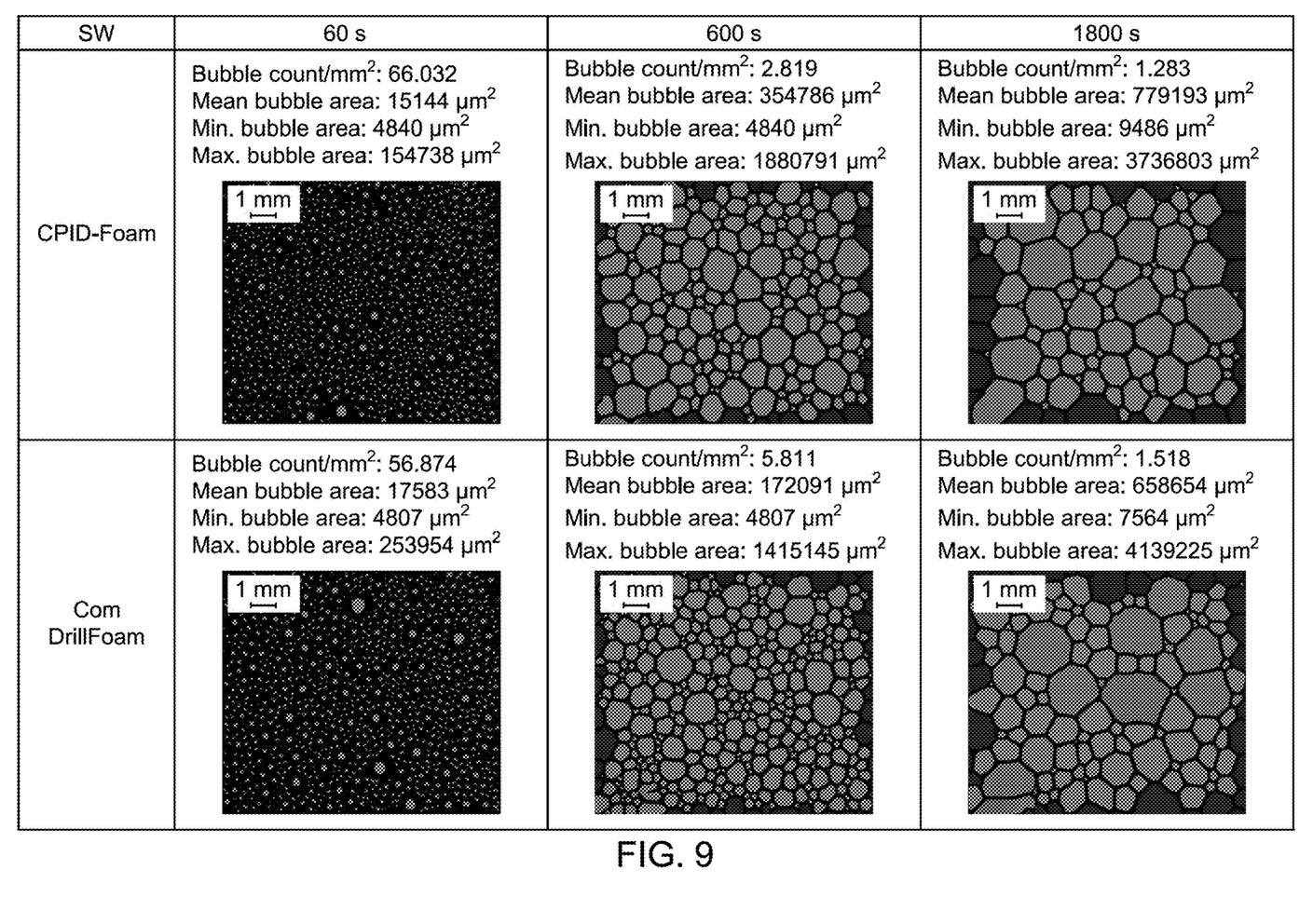
FIG. 9 shows 2D images of the foam structure and bubble size of the foam systems using SW at different time intervals under ambient conditions, according to certain embodiments.

FIG. 7, FIG. 8, and FIG. 9 show two dimensional (2D) images of the foam bubbles for the tested surfactant under ambient conditions and the commercial blend utilising DI, SW, and FW, respectively, at different times. Overall, it was possible to see that for all of the DI, SW, and FW cases, the foam bubble count decreased over time from left to right. On the other hand, the bubble sizes get larger. Its stability increases with the bubble count at a given point in time. It was observed that at 60 s, there was no visible contrast in the bubble count and structure for all tested foam system at this early foaming time. This is further supported by the fact that, as FIG. 6 illustrates, the initial bubble count ($BC_{initial}$) for the tested foam systems has a narrow window of variation range, from 60 to 85 bubbles per $mm^2$.

Figure 10:
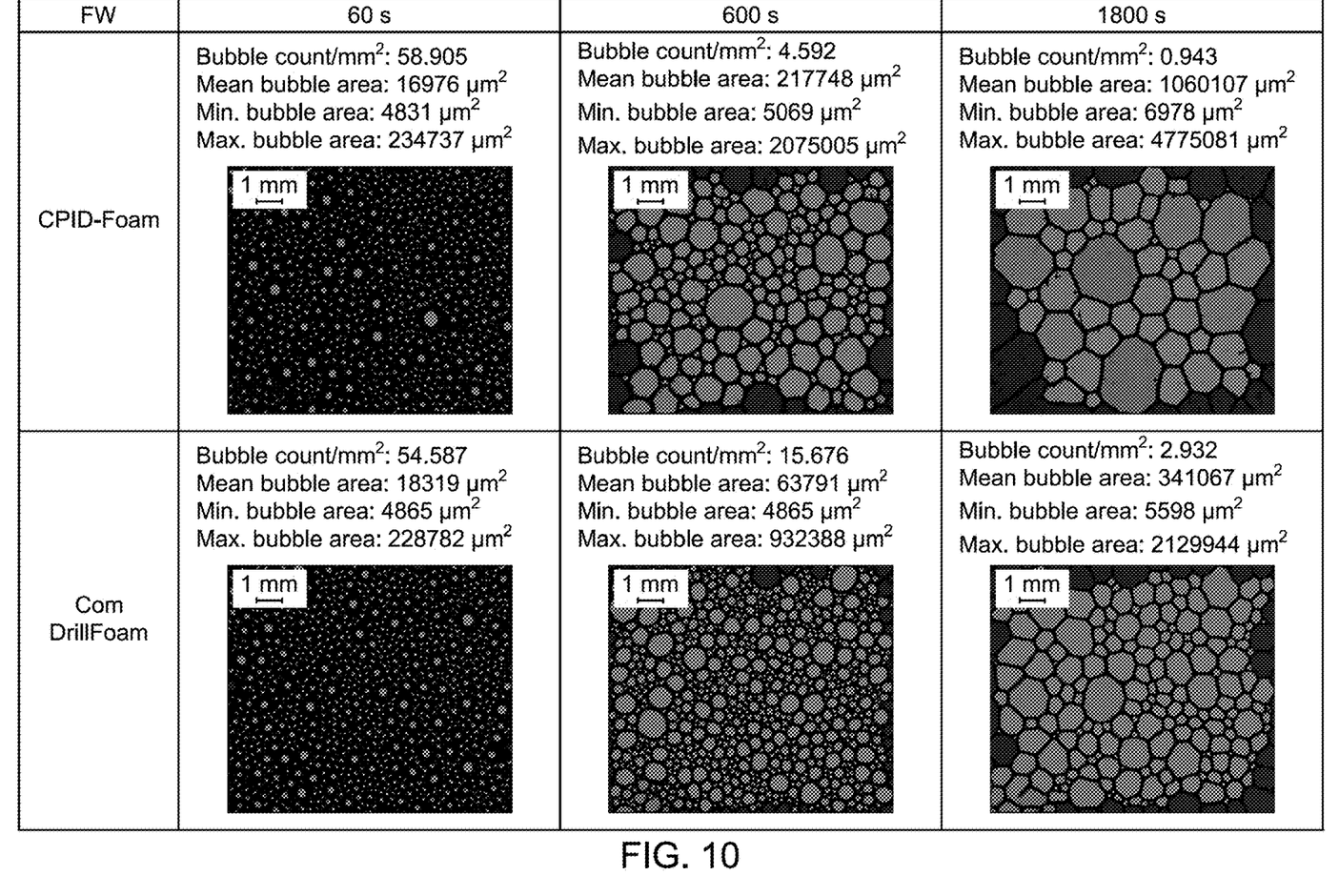
FIG. 10 shows 2D images of the foam structure and bubble size of the foam systems using FW at different time intervals under ambient conditions, according to certain embodiments.

As demonstrated in FIG. 10, the CPID-Foam maintained a good foam structure that was comparable to the commercial blend even after 1800 s of foam formation in the DFA system. In line with this finding, the commercial blend (Com-DrillFoam) demonstrated a consistent stability increase with rising water salinity, as will be covered in the next section.

Figure 11:
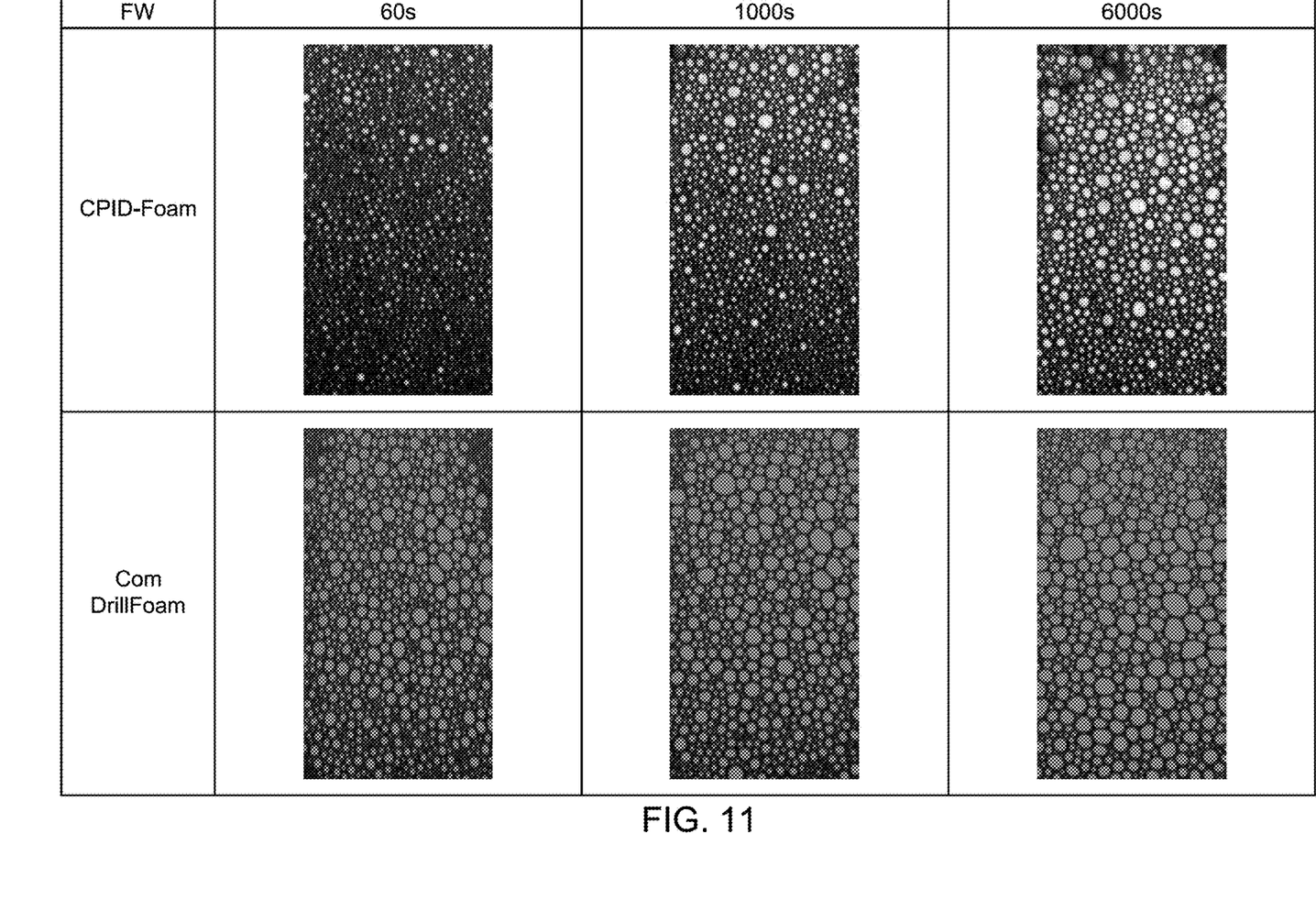
FIG. 11 shows 2D images of the foam structure and bubble size of the foam systems using FW at a pressure of 1000 psi and a temperature of 60° C. over different time intervals, according to certain embodiments.
Figure 12:
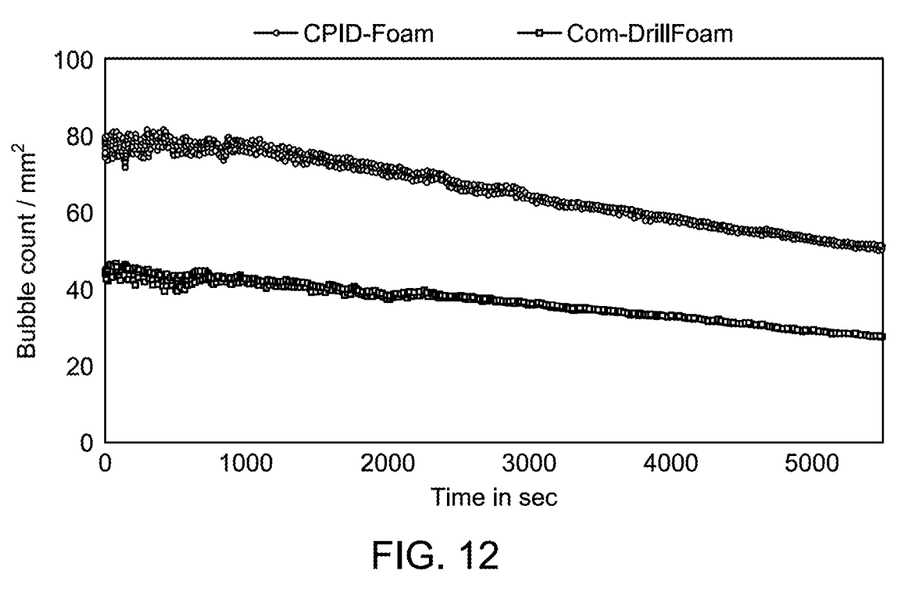
FIG. 12 shows bubble count of the foam systems over time using FW at a pressure of 1000 psi and a temperature of 60° C., according to certain embodiments.

Furthermore, in comparison to Com-DrillFoam, CPID-Foam using FW at higher pressure and temperature had a greater bubble count per $mm^2$, as shown in FIG. 11. Additionally, the CPID-Foam's shape was more spherical, indicating that it was a wetter foam with a higher liquid content and therefore better stability. This suggests the surfactant as a significant potential option for use in UBD procedures.

Example 5: Foam Stability

The foam volume stability (FVS) parameter can be used to quantify the stability of the foam system. The term "FVS" describes the portion of remaining foam volume that remains after stopping foaming in relation to the maximum volume of foam. The below formula can be used to determine FVS:

$$FVS(t) = \frac{V_t(\text{foam})}{V_f(\text{foam})} \times 100$$

where V denotes the volume of foam observed in the glass cylindrical column, t and f denote the volume of foam measured at different points in time and the volume of foam remaining after the bubbling ended, respectively. The foam half-life ($t_{FVS\,50\%}$) is the amount of time needed for the foam volume to decrease by half of its initial value.

The salinity of the liquid phase has a major impact on any surfactant's stability and foamability. Increasing salinity in the water could affect the electrostatic double-layer forces, which would reduce the solubility of the surfactant and cause destabilised foam. However, this may not hold true for all surfactants where the salinity of the water just slightly affects the stability of the foaming.

To investigate the surfactants' suitability for varying water salinities, it is important to perform independent testing on each of them. The stability of a foaming system is ambiguously affected by the salinity of the electrolyte. Nonetheless, divalent ions typically have a greater impact on foam stability than monovalent ions do.

Figure 13:
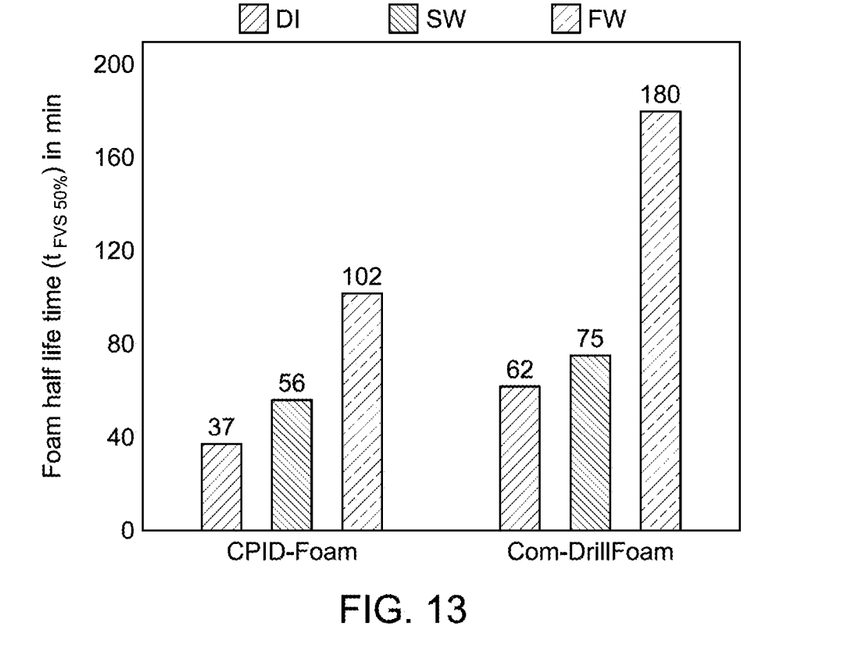
FIG. 13 shows stability of the foam systems using DI water, SW, and FW at ambient conditions, according to certain embodiments.

The stability of CPID-Foam enhances with increasing water salinity, exhibiting a trend comparable to that of a commercial foam blend, as shown in FIG. 13. It indicates the good compatibility of CPID-foam with different water salinities. Under elevated pressure and temperature conditions (100 psi and 60° C.) with high salinity water, CPID-Foam exhibited a foam half-life exceeding 180 minutes, similar to the Com-DrillFoam system. In practical field applications, gas and liquid are injected at high rates that is gas injection rate of 1000 SCFM and 70 GPM to create a drilling foam. It moves at high velocity, ensuring effective hole cleaning. According to field experience and literature, the half-life of proposed CPID-Foam is sufficient to maintain the stable foam throughout its journey down to the bit and up to the surface for complete circulation.

There are three primary factors that affect foam stability: liquid drainage, coarsening, and bubble coalescence. Liquid drainage plays a substantial role on foam stability by reducing the liquid content within the foam, which affects the thickness of the lamella film. This process is driven by both gravity and capillary pressure where capillary pressure drains liquid from the foam film to the plateau borders, while gravity subsequently drains the liquid from plateau borders.

Foam liquid stability (FLS) is a critical parameter for assessing foam stability and its liquid drainage. FLS measures the foam's capacity to hold liquid and indicates the foam's dryness. The drainage half-life time ($t_{FLS\ 50\%}$) represents the duration required for FLS to decrease to 50% of its initial value. FLS can be calculated using the following equation:

$$FLS(t) = \frac{V_{i(liquid)} - V_{t(liquid)}}{V_{i(liquid)} - V_{f(liquid)}} \times 100$$

where, $V_{i(liquid)}$ denotes the initial volume of liquid before gas bubbling. After gas bubbling, the liquid volume, $V_{t(liquid)}$ changes over time t, with the difference between them representing the amount of liquid retained within the foam structure. The higher foam liquid stability (FLS) value represents better foam stability, because it reflects the foam's ability to hold more liquid within the lamella film and reduce liquid drainage from the foam.

Figure 14:
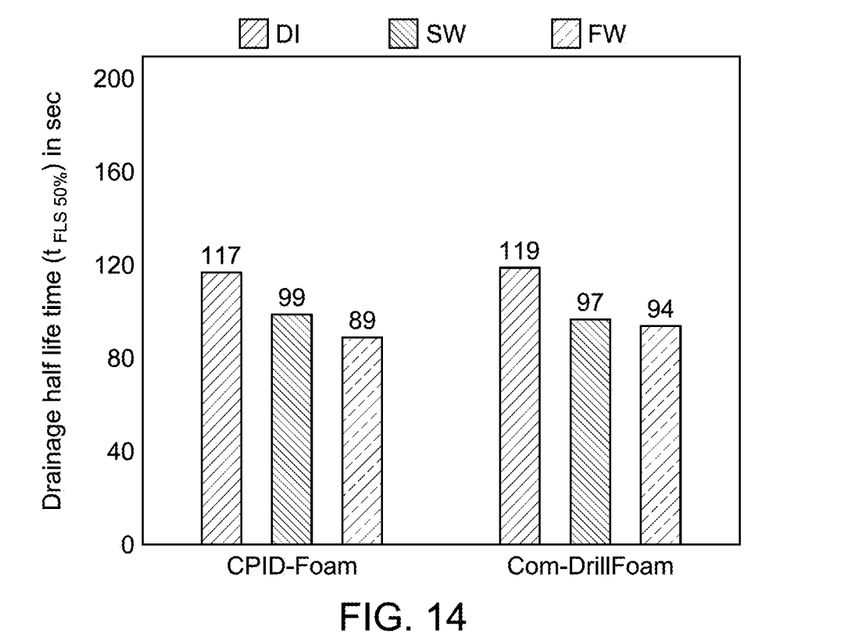
FIG. 14 shows drainage half-life time $t_{FLS\ 50\%}$ for the foaming solutions in DI, SW, and FW at ambient conditions, according to certain embodiments.

FIG. 14 presents the drainage half-life for the tested foaming systems at ambient conditions. Generally, the $t_{FLS50\%}$ values for all surfactants decreased as water salinity increased. CPID-Foam exhibited a similar trend to the commercial blend, with comparable $t_{FLS50\%}$ values across different salinities, which indicates similar foam stability for both systems.

Therefore, the ammonium alcohol ether sulfate surfactant (CPID-Foam) is identified as a promising candidate for underbalanced drilling (UBD) applications because of its excellent performance across varying salinities and promising stability under both ambient and elevated conditions. This analysis also showed that, foam properties of CPID-Foam have enhanced potentiality, and can be enhanced more by additional additives such as foam stabilizers or polymers etc.

According to the present disclosure, the foaming properties of an anionic surfactant, ammonium alcohol ether sulfate (CPID) investigated under high pH conditions are favorable for underbalanced (UB) drilling operations. The tests were conducted across various water salinities and under both ambient and elevated pressure and temperature (P&T) conditions. The CPID-Foam exhibited good foam stability and foamability compared to the commercial blend and, with a foam half-life exceeding 180 minutes at 1000 psi and 60° C., mimics actual drilling environments. The stability of the foam system is assessed by foam half-life and liquid drainage half-life, while foamability is characterized by initial foam height, bubble size, count, and distribution. Additionally, CPID-Foam exhibited superior foaming ability in terms of initial foam height and bubble count compared to the commercial blend. These results indicate that CPID-Foam is effective for use in underbalanced drilling applications.

Numerous modifications and variations of the present disclosure are possible in light of the above teachings. It is therefore to be understood that within the scope of the appended claims, the invention may be practiced otherwise than as specifically described herein.

The invention claimed is:

1. A method of underbalanced drilling, comprising:
   drilling into a subterranean geological formation to form a wellbore therein;
   injecting a foaming agent into the wellbore during drilling at a wellbore pressure that is below a pore pressure of the subterranean geological formation, wherein the foaming agent forms a foam in the wellbore at a drilling surface at a bottom of the wellbore; and
   transporting drill cuttings formed by the drilling away from the drilling surface in the foam,
   wherein the foaming agent has a pH of 8 to 11 and is an aqueous solution comprising an ammonium alcohol ether sulfate surfactant in an amount of 0.25 to 0.75 wt. %, and
   wherein the foaming agent has an initial bubble count of at least 60 per $mm^2$ and an average bubble area of at least 160,000 $\mu m^2$ after 60 sec.

2. The method of claim 1, wherein the foaming agent has a pH of 9 to 10.

3. The method of claim 1, wherein the foaming agent is an aqueous solution further comprising at least one selected from the group consisting of deionized water, synthetic seawater, and formation water.

4. The method of claim 1, wherein the foaming agent is an aqueous solution further comprising formation water.

5. The method of claim 1, wherein the surfactant is present in the foaming agent in an amount of 0.5 wt. %.

6. The method of claim 1, wherein the foaming agent has a foam height of at least 193 mm.

7. The method of claim 1, wherein the foaming agent has an initial bubble count of at least 80 per $mm^2$.

8. The method of claim 1, wherein the foaming agent has an initial foam height of at least 60 mm.

9. The method of claim 1, wherein the foaming agent has an initial bubble count of at least 75 $mm^2$.

10. The method of claim 1, wherein the foaming agent has a spherical foam structure.

11. The method of claim 1, wherein a bubble count of the foaming agent decreases by less than 25% over 2 hours.

12. The method of claim 1, wherein the foaming agent has a pH of 9.5.

13. The method of claim 1, wherein the foaming agent has a foam half-life of at least 35 min.

14. The method of claim 1, wherein the foaming agent has a foam half-life of at least 56 min.

15. The method of claim 1, wherein the foaming agent has a drainage half-life of at least 89 min.

16. The method of claim 1, wherein the foaming agent has an average bubble area of at least 700,000 $\mu m^2$ after 30 min.

17. The method of claim 1, wherein the foaming agent injected into the wellbore consists of one ammonium alcohol ether sulfate surfactant, KOH and water.

* * * * *